March 3, 1936. T. L. L. McAFEE 2,033,043
BRACKET FOR WINDOW SHELVES
Filed April 11, 1933
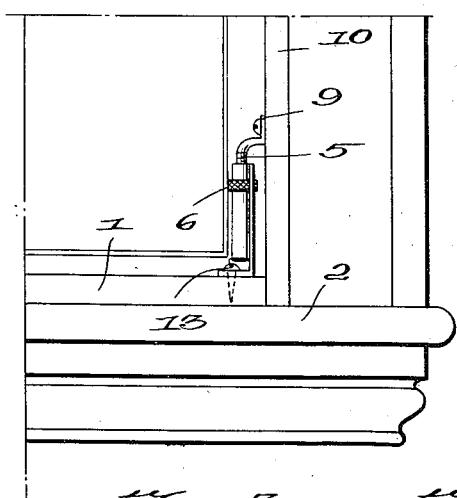
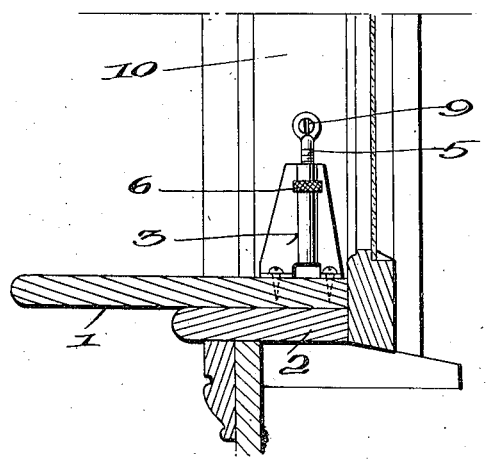
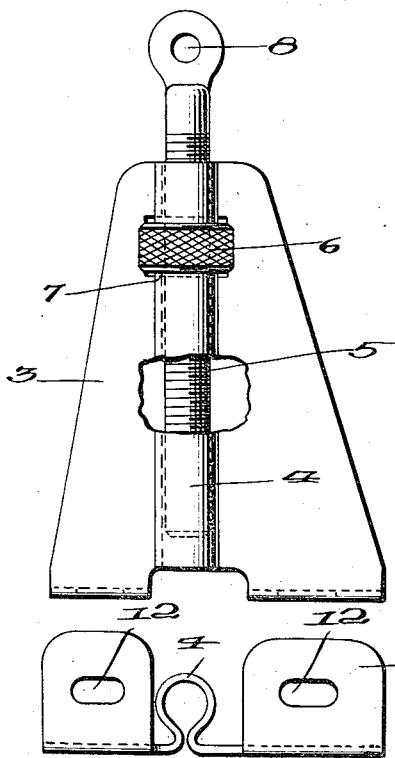
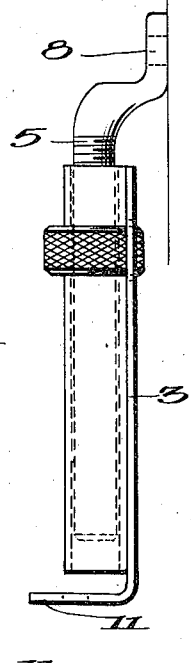
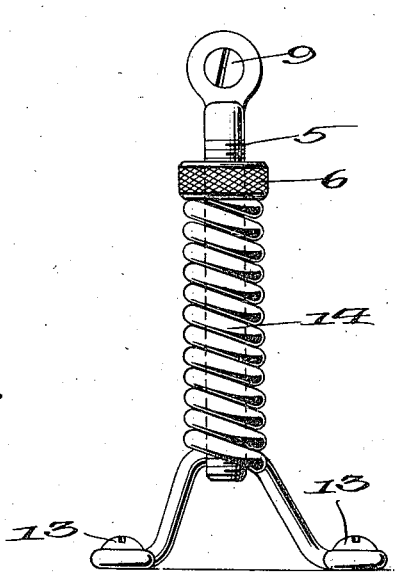
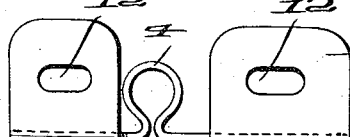
INVENTOR
Thomas L. L. McAfee
BY Vernon E. Hodges
his ATTORNEY Patented Mar. 3, 1936

2,033,043

UNITED STATES PATENT OFFICE 2,033,043

BRACKET FOR WINDOW SHELVES

Thomas L. L. McAfee, Malden, Mass.

Application April 11, 1933, Serial No. 665,594

3 Claims. (Cl. 248—208)

My invention relates to an improvement in brackets for window shelves for the accommodation of potted plants and the like.

This invention consists of a bracket, a threaded bolt, and means for the adjustment of the bracket two ways to accommodate any variance in position of the regular stop-bead screw, and a shelf to which the bracket is secured.

The object is to provide a simple arrangement for the attachment of the shelf and its brackets to the regular stop-bead screws with means for adjusting the position of the shelf so that it will rest firmly on the stool or sill of a window.

In the accompanying drawing:

Fig. 1 is a front elevation;

Fig. 2 is a transverse sectional view;

Fig. 3 is an enlarged rear view of one of the brackets with a part broken out to show the threaded bolt;

Fig. 4 is a side view of the same;

Fig. 5 is a bottom view of the bracket; and

Fig. 6 shows a slightly modified construction.

The numeral 1 represents the shelf, and 2 is the window stool or sill upon which the shelf is intended to rest or pinch, as shown in Figs. 1 and 2. A bracket 3, preferably made of sheet-metal in the forms shown in Figs. 1 to 5, is formed with a centrally located sleeve 4 made by a bend in the metal, and through this sleeve 4 a threaded bolt 5 extends.

A knurled nut 6 turns on the threads of the bolt and is confined within a slot 7 in the sleeve 4.

The upper end of the bolt has a screw eye 8 to receive screw 9 which is a regular lowermost screw for fastening the stop-bead 10 in the side of the window-frame. Obviously the threaded bolt could be fastened by some other screw, but by making the whole device of a size to utilize the regular stop-bead screw it does away with additional holes, and in that way the window is not marred or damaged in any way by reason of the use of my improved shelf.

The lower end of the bracket terminates in a flange 11, and the elongated holes 12 are formed in the flange to receive screws 13 by which the bracket is adjustably secured to the shelf 1.

In Fig. 6, I have shown the sleeve 14 made in the form of two tightly spirally wound wires, thus making the entire bracket of wire instead of sheet-metal in this form of the device.

It would be possible to use this bracket to hang a shelf if desired higher up on a window, using regular stop-bead screws by fastening the bracket to the under side of the shelf instead of to the top. It will be observed that the brackets thus constructed are adjustable two different ways to accommodate any variation in regular position of the screws in the stop-bead, so that no new holes are necessary, and the finish of the window is not marred or damaged in any way as previously stated. Thus a very simple, inexpensive, and at the same time effective means is provided which will have utility and practicability, and at the same time will afford a neat and attractive means of attachment for the shelf.

These brackets are preferably made for right and left sides of the window, and in the drawing Fig. 1 show the bracket mounted on the right-hand side, and Fig. 2 shows it on the left side of the window.

I claim:

1. A device of the character described including a threaded bolt, a sleeve formed of two tightly spirally-wound wires through which the bolt extends, a nut constructed and adapted to screw on the threads of the bolt and engage one end of the wire sleeve, the extreme outer ends of the sleeve and bolt being constructed and adapted to be secured to two different objects adjustably connected with each other.

2. A device for securing a shelf to a window sill including two members, one of said members having a foot extending therefrom and adapted to be secured to the shelf, the other member including means whereby it may be secured to the side wall of the window frame, and means connecting said members whereby they may be adjusted longitudinally relative to one another.

3. A device for securing a shelf to a window sill including a substantially L-shaped bracket having a sleeve on one leg thereof and provided with a slot extending transversely through the sleeve and one leg of the bracket, the other leg of said bracket having openings therethrough whereby said bracket may be secured to the shelf, a threaded bolt extending into said sleeve and provided with an eye at the end thereof remote from said sleeve, said eye adapted to be secured to the side wall of the window frame, and a nut confined within the slot and constructed and adapted to screw on the threads of the bolt whereby the said bracket and the said bolt may be adjusted relative to one another.

THOMAS L. L. McAFEE.